INVENTOR
PIERRE M. G. TOULON

BY William R. Liberman
ATTORNEY

Aug. 25, 1953  P. M. G. TOULON  2,650,305
CONVERTER AND OTHER ELECTRICAL APPARATUS
WITH ROTARY COMMUTATORS
Filed Aug. 4, 1947  3 Sheets-Sheet 3

INVENTOR
PIERRE M. G. TOULON

BY *William R. Lieberman*
ATTORNEY

Patented Aug. 25, 1953

2,650,305

UNITED STATES PATENT OFFICE 2,650,305

CONVERTER AND OTHER ELECTRICAL APPARATUS WITH ROTARY COMMUTATORS

Pierre Marie Gabriel Toulon, Paris, France, assignor to Products & Licensing Corporation, New York, N. Y., a corporation of Delaware Application August 4, 1947, Serial No. 766,036
In France January 31, 1945

Section 1, Public Law 690, August 8, 1946
Patent expires January 31, 1965

11 Claims. (Cl. 250—36)

This application relates generally to rotary converters and other electrical apparatus utilizing rotary commutators.

For rectifying high voltage currents, a known system involves use of a rotary rectifier, usually comprising a synchronous motor driving one or several conducting arms comprising two contacting ends which arrive, once in each revolution of the arms, opposite fixed conducting segments connected respectively with the terminals of a high voltage transformer.

The current is carried by a spark or arc which is started between either of the rotary ends and one of the fixed segments.

Such rectifiers have, for instance, been utilized for the production of high voltages of from 10,000 to 100,000 volts, for example, intended for the industrial purification of gases. They are quite suitable for charging a capacity, when the current intensity is very low, for instance of the order of 100 ma. For high values of current, however, the arc does not break up when a contact end leaves a segment, and considerable difficulty results.

When attempting to increase substantially the intensity of commutated current, for an industrial application of the apparatus, serious consequences are likely to ensue if the arc discharge started on a tip extends sufficiently for short-circuiting several successive segments; the device is, therefore, entirely unsuitable for such applications.

My invention has for its primary object an improvement which makes possible the construction of converters and other apparatus involving the use of rotary commutators, which are suitable for large outputs, and, which are, nevertheless, not exposed to the risk of short-circuits as a result of commutation. The improvement may be applied to converters provided with rotary commutators intended for all sorts of converting operations, i. e., for conversion of alternating current into direct current and vice versa, frequency changers, etc. It applies, further, to all commutating devices intended for other operations, such as the regulation of voltage, of intensity of current, of power, etc., for direct current as well as alternating current, and for generation of reactive power (with a leading or a lagging current) etc. It moreover applies whatever may be the type of rotary commutators involved, whether the type comprising fixed segments with rotary pins, needles or brushes, or the type comprising the reverse disposition, or other possible types. My invention also applies whatever may be the way in which circuits are completed between contacts, whether they are completed exclusively by sparks bridging over contacts, or otherwise.

The improvement according to my invention is essentially characterized by the fact that the current supplied to the commutator from a supply line is, at the moment of commutation, reduced to zero for a short interval, sufficient, nevertheless, for suppressing ionization of the atmosphere around contacts which are in process of breaking a current, thus preventing striking of an arc discharge at the end of the commutation.

If several commutators are connected in parallel and are given suitable relative angular displacements, the total current delivered may remain uninterrupted, by employment of my invention.

For accomplishing the annulment of current from a supply line for a short time during commutation, use may be made of various devices, as, for example, a mechanical switch or an auxiliary alternator; among the devices which are available, preference is given to ionic tubes, or to an electronic tube or valve, in accordance with my invention.

The electronic tube may comprise, according to my invention, a control grid, the potential of which is changed synchronously with the rotation of the main commutator, so as to secure the desired effect. The tube may constitute, at the same time, the utilization or load circuit of the system. Such will be the case, for instance, in supplying power to a high frequency oscillator supplied from electric mains. The control of the grid of the oscillator may be accomplished by a commutator, directly, or, indirectly by means of a pilot spark generator, in accordance with different embodiments of my invention.

Use may also be made, according to my invention, of two or more independent polyphase current distribution networks, each one of them being connected to a rotating pin or arm, or to groups of pins or brushes; the different networks may be connected in parallel, and the arc discharge will be suppressed, at the required times, by means of ionic or electronic valves connected in series with each one of the pins or brushes.

The above described system can, with advantage, utilize a starting high frequency system for starting the arc discharge (or the spark) between the pin and the segment at the moment required for accomplishing effective commutation.

Reference is now made to the appended drawings, wherein I describe various modes of carrying out the improvements which are the objects of the invention. The particular features of the specific embodiments of my invention described hereinafter should be considered merely as exemplifying the invention, it being understood that various equivalent arrangement may be utilized without departing from the true scope and spirit of the invention.

Figure 1:
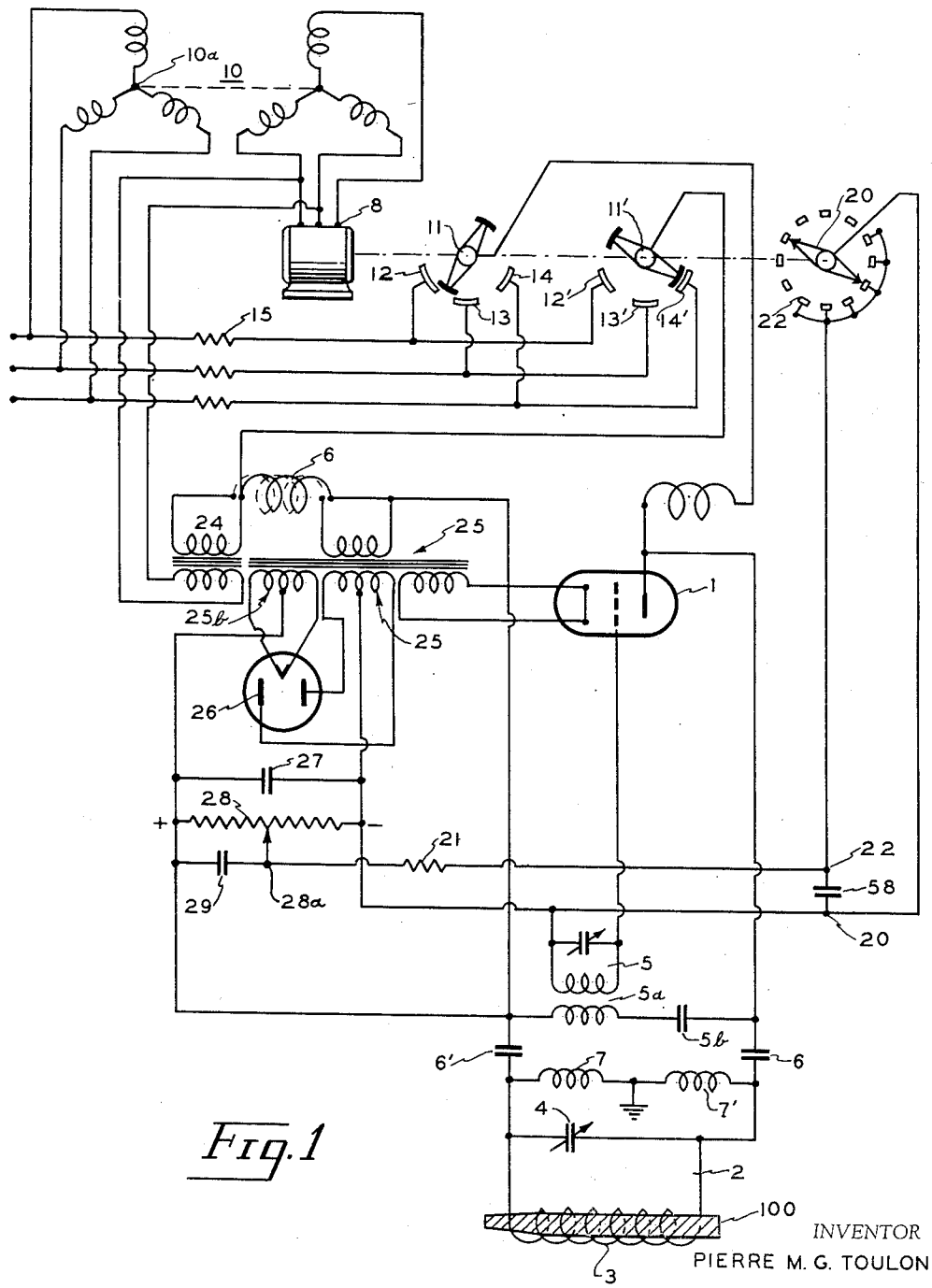
Figure 1 is a schematic circuit diagram illustrating an application of the invention to the supply of a high power oscillating triode, intended, for instance, for supplying current for electric induction heating.

The system illustrated in Figure 1 is particularly interesting, since it is possible, thereby, to very easily suppress the charge generated at the very moment of commutation, by polarizing abruptly the grid of a triode.

The oscillating triode is identified by the reference numeral 1, and is utilized to drive an oscillating circuit 2, which includes an inductance 3 within which may be placed the article to be heated in accordance with the well known practice in the art of induction heating, and a condenser 4.

The high frequency feedback voltage needed for maintaining the oscillations generated by the triode 1 is obtained by means of a high frequency winding 5, connected in the grid circuit of the triode 1, and coupled with the oscillating circuit 2 by being inductively coupled with a coil 5a connected across the oscillating circuit 2 via D. C. blocking condenser 5b.

The high voltage direct current required for supplying the anode of the triode 1 is obtained by means of a rotary rectifier, driven, for example, at a speed of 1,500 revolutions per minute by a motor 8 synchronized with the frequency of the network 9, which is three-phase, and which may have, for example, a frequency of 50 cycles per second. The motor 8 is supplied with low voltage through a step down transformer 10.

The rectifier referred to in the previous paragraph comprises two brushes, 11 and 11', rotating with respect to the commutator segments 12, 13, 14 and 12', 13', 14', respectively, which are connected respectively to the separate phases of the alternating current supply network 9. In series with each of the phases is a resistance 15, which serves as a protective device. In the system under consideration the brushes 11 and 11' are assumed to rotate at 1,500 revolutions per minute, the positive and negative brushes being displaced in position by 90° with respect to one another, and the commutator segments connected to the phases being disposed only in the lower half of a circle.

Figure 2:
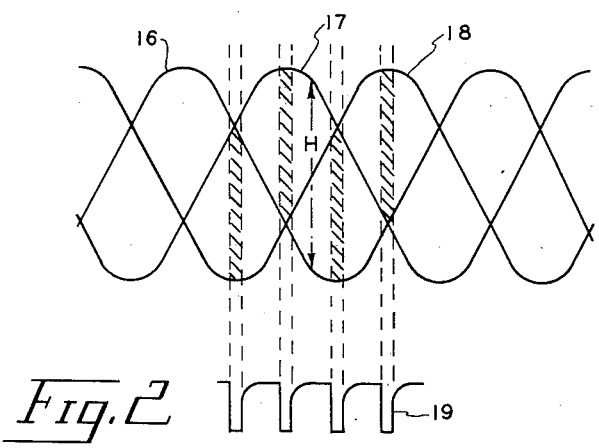
Figure 2 is a timing and wave form diagram, which is of assistance in explaining the operation of the system represented in Figure 1.

The diagram of Figure 2 shows the values of the voltages, 16, 17 and 18, applied to the pairs of segments 12—12', 13—13', 14—14', respectively, as a function of time, the neutral point 10a of the transformer primary winding being taken as the origin, i. e., the voltage of the neutral point 10a being taken as 0. The voltage which appears between the brushes 11 and 11', then, corresponds at each instant to the ordinates which separate the lower and the upper envelopes of the curves.

According to my invention, the output of the triode 1 is periodically interrupted by biasing its grid to cut-off, during each commutation, i. e., during the passage of each one of the brushes from one segment to the next one, or at times corresponding with the hashed zones of Figure 2.

In Figure 2 the average bias of the grid with respect to the cathode of triode 1 has been represented as a function of time by the curve 19, it being understood that this bias is superposed on the high frequency oscillations during the active periods of the triode.

As can easily be seen in Figure 2, the bias voltage 19 assumes six times per cycle a high negative value, which serves to cut off the output of the triode 1.

To control the bias voltage there is installed on the shaft of the motor 8 an auxiliary revolving commutator 20. For obtaining negative bias, use is made of a small auxiliary rectifier system, which supplies sufficient voltage for blocking of the triode 1. The positive terminal of the auxiliary system must, of course, be connected to the cathode of the triode 1.

In Figure 1 of the drawings are schematically shown all the devices which are used for generating the bias. Use is made of a step-up transformer 25, comprising a secondary 25a having a neutral terminal, a full wave rectifier 26 and a filtering circuit 27. The transformer 25 may preferably comprise a further secondary winding, 25b, which serves to supply heating current for the cathode of rectifier 26. The windings of the transformer must, of course, be insulated for high voltage and for high frequency. For providing high voltage, use is made of a transformer 24, the primary winding of which is supplied at low voltage, and which is carefully insulated from the secondary. Thus is obtained the necessary power for both heating of the cathode and providing bias voltage.

The small direct current provided by rectification in rectifier 26 is applied in potentiometer 28, over which may be positioned a variable contact 28a, which enables choice of the mean bias of the triode 1, to enable the output power of triode 1 to be regulated. A large capacity 29 is connected between the cathode and the slider for preventing fluctuations of voltage.

The grid of the tube 1 is connected to the slider 28a via the high frequency grid excitation winding 5 connected in series with a resistance 21.

The winding 5 is intended for inducing on the grid the feedback voltage necessary to maintain high frequency oscillations in the oscillating circuit, for instance, at a frequency of 50,000 per second.

A condenser 58, connected between one terminal of the winding 5 and the negative pole of the small direct current supply, i. e., to the center terminal of secondary winding 25a, bypasses high frequency. Accordingly the terminal 5c of winding 5 is for high frequency connected to the cathode of triode 1.

Under normal conditions, the average bias of the grid of triode 1 is, in one actual embodiment of my invention, rather low, say about —500 volts, and the grid circuit oscillates. At the instant of commutation, the condenser 58 is short-circuited by rotary switch 20, so that the grid momentarily assumes the negative maximum voltage supplied by the small auxiliary source, say —2000 volts. That voltage is sufficient for entirely blocking the tube, i. e. for annuling its anode current. For obtaining this result, use has been made, in the system of Figure 1 of the rotary switch 20, which, periodically (300 times per second) makes contact, for a very short time, with fixed contacts such as 22, all connected together and disposed along a circumference of a circle.

When the brush 20 is within the interval separating two fixed contacts 22, a condition which exists most of the time, the triode 1 oscillates normally. When, however, the brush 20 touches any one of the fixed contacts 22, the triode 1 ceases oscillating, the plate current becomes zero, and commutation of the brushes 11 and 11' can thus be realized without breaking any current. As soon as the rotary contact of switch 20 leaves a contact 22, the grid resumes very rapidly its normal voltage (the time-constant corresponding to the capacity 58 and the resistance 21 being very low) so that the tube starts its oscillations again. As the time of commutation is very small in comparison with the total time, the reduction of useful power accomplished is generally negligible.

Thus the rotary contact of switch 20 (which does not receive high frequency) accomplishes variation of the grid bias and can cut out periodically during a very short time at each commutation (1/2000 of a second for instance) the high frequency output current of the triode 1. It results in that the arc discharge which forms between the brushes 11 or 11' and the segments 12, 12', or 13, 13', or 14, 14', can be easily quenched, as the atmosphere which separates the successive segments 12, 13, 14 or 12', 13', 14' is not ionized, and any danger of starting an arc between the successive segments 12—13 or 13—14 or 12'—13' or 13'—14' is entirely avoided.

When it is desired to use the oscillating circuit for high frequency heating, and specifically for heat treatment of material, it is recommended that the winding of the inductance 3 be grounded, in order to avoid all dangers of electrocution. For that purpose is provided, as illustrated in Figure 1, condensers 6' and 6" in series between the triode and the oscillating circuit; these condensers offer a path for the high frequency currents, but block the high voltage. Moreover, inductances 7, 7' are installed between the ends of the inductance 3 and ground; those inductances operating for passing to ground low frequency voltages which may build up, while they do not bypass the high frequency, but serve as chokes therefor.

The grid current of a high power triode 1 is not always negligible, and the voltage needed for blocking the tube can sometimes be rather large. It results, accordingly, that the brush 20, and also the contacts 22, are exposed to marked wear and tear. My invention provides improvements illustrated in Figure 3 of the drawings as a modification of the system of Figure 1, for avoiding that wear, by making use of a pilot spark.

Figure 3:
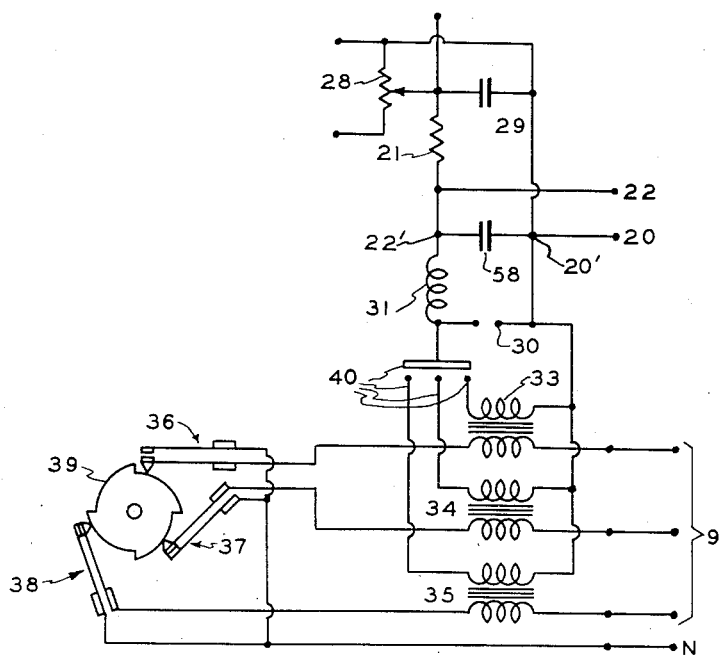
Figure 3 is a schematic circuit diagram of a device which enables starting of an arc which determines the voltage of a grid of an electronic valve, and thus permits accomplishment of commutation.

In Figure 3 are only represented those elements of the system of Figure 1 required for the exposition of the modification of that system, namely, the potentiometer 28, which enables adjustment of the basic bias of the triode 1, the condenser 58, which short-circuits the high frequency excitation winding 5, and the resistance 21, which permits short-circuiting the conductors 20—22 during commutation.

As already demonstrated above, the conductors 20—22 must be short-circuited periodically (300 times per second) for an extremely short time.

According to the improved embodiment illustrated in Figure 3, that result is obtained by means of a spark gap 30, which is started in action by a pilot spark. Connected in series with one of the conductors 20, 22, for instance, the conductor 20, is a high frequency coil 31, between the terminals of which a high voltage is instantaneously induced when the spark gap 30 breaks down. That induction is preferably obtained by employing at 31 an induction coil such as a Ruhmkorf coil. Figure 3 illustrates 3 phase line 32 which supplies operating current for three small inductance coils 33, 34 and 35, connected respectively to, the three phases of the line 32 and three make-and-break devices 36, 37, 38 connected, respectively, in series with each one of the inductance coils 33, 34, 35.

On the shaft of the synchronous motor 8 is mounted a ratchetwheel 39 provided with 4 teeth. The make-and-break devices 36, 37 and 38 are displaced angularly by 120° from one another.

Each one of the induction coils 33, 34, and 35 is connected to one of the auxiliary spark gaps 40, one terminal of which is connected to an end of the coil 31. The sparks 40 are fired in succession, as the ratchetwheel rotates and breaks the contacts 36, 37, 38 in succession, and this fires the main spark gap 30 six times per cycle, thus increasing negative bias of the grid of triode 1, and consequently blocking the latter, and accomplishing suppression of the commutator current by short-circuiting the condenser 58.

My invention also applies to the commutation of high voltage rectifiers (or more generally of high voltage converters) in which one (or several) small auxiliary low voltage rectifier (with or without a grid control) serves to secure the momentary suppression of the main current during commutation.

Figure 4:
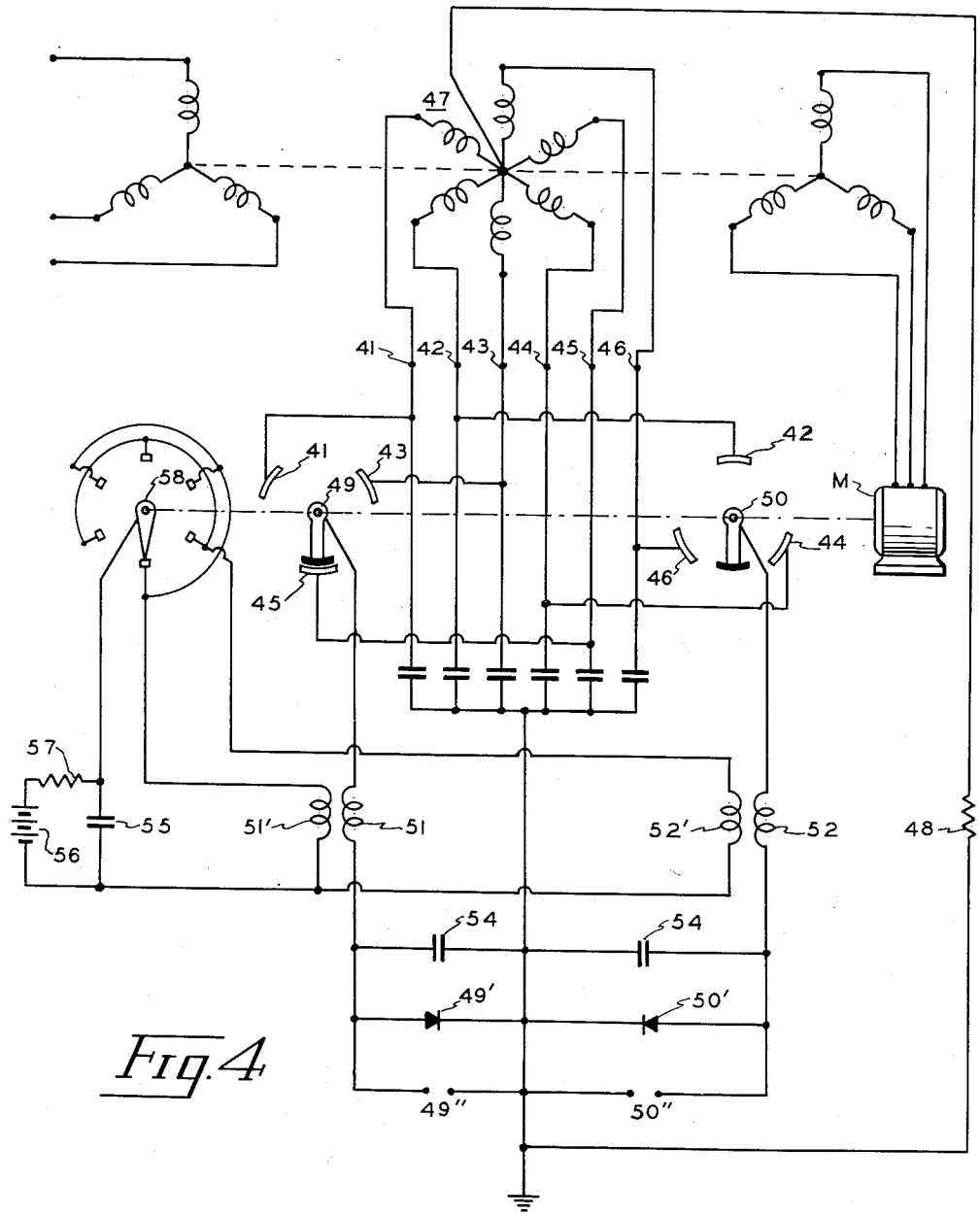
Figure 4 illustrates in schematic circuit diagram a system which enables suppression of the current in an arc, during commutation, and which utilizes low voltage electronic valves.

A circuit diagram illustrating the principle of such a rectifier system is shown in Figure 4 of the drawings. The six output leads of the main hexa-phase transformer are shown, in that figure, at 41 to 46; the neutral point of the system is identified by the numeral 47, and the rectified current load is represented by the resistance 48.

A rotary distributor, driven by a synchronous motor M (operating at 3000 revolutions per minute, for example) comprises two collecting brushes 49 and 50, which are connected in parallel and rotate with respect to two independent circularly arranged groups of contacts. According to my invention, a small rectifier is disposed in series with each one of the brushes 49, 50, in circuit with the brush 49, the rectifier 49', and in circuit with the brush 50, the rectifier 50'. Those rectifiers are required to handle rather large currents, for example, 5 to 50 amperes, but under low voltage conditions only, for example, 500 volts for a 10,000 volt rectifier. They can be protected by spark gaps 49'' and 50'', which serve to limit the voltage, but which cannot start a discharge under normal operative conditions. The phases of the hexa-phase supply are connected to separate ones of the conducting segments, the branches 41, 43, 45 of the hexaphase transformer being connected to the three segments of a first group, operating with brush 49, and the branches 42, 44, 46 being connected to the three remaining segments, operating with brush 50. The lengths of the segments and their spacing, as well as the relative positions of the segments and the brushes, are so chosen that connections are made alternately, i. e., so that the brush 49 contacts first the segment 41 while the brush 50 contacts no segment; then the brush 50 contacts the segment 42, while the brush 49 contacts no segment; then the brush 49 contacts the segment 43 while the brush 50 contacts segment opposite, etc.

A slight overlapping, however, is established in passing from one segment to another, in order to enable commutation. Moreover, the rotary brushes may be protected against wear by being provided with large nickel soles which are adjustable and which can be removed and replaced; and, besides, they may be separated from the segments by a very narrow gap, which, if desired, avoids friction, yet does not oppose the establishment of very short arcs, involving negligible voltage drops.

The discharge is started by means of a pilot spark. In series with the brush 49 is, therefor, installed a high frequency coil 51, and in series with the brush 50 is connected a high frequency coil 52. Moreover, between each one of the segments 41 to 46, inclusive, and ground is inserted a small condenser 53. Other small condensers 54 are connected between the ends of the coils 51 and 52 and ground. All these small condensers are intended for fixing the high frequency potential of the various conductors, and for short circuiting high frequency currents.

An arc discharge is initiated alternately on brushes 49 and 50, by means of high frequency voltages induced alternately in the coils 51 and 52.

For that purpose the coils 51 and 52 are coupled with other coils 51' and 52', which periodically receive the discharge of a condenser 55, which is continually recharged after each discharge, by a high voltage 56, through the resistance 57. The production of discharges at the proper times is accomplished by means of a rotary distributor 58 synchronously driven from motor M, which comprises six contacts, alternately connected to the two coils 51' and 52'.

If the angular position of the rotary arm of distributor 58 is properly chosen, at the moment the arc starts on one of the brushes (49 for instance), the voltage of the corresponding commutator segment is higher than the voltage of the brush 50 which delivered current at a preceding moment. The rectifier 49', accordingly, starts delivering current, while in the rectifier 50' the current has a tendency to reversal. As that reversal cannot take place, the current remains at zero in the brush 50 for some time, which permits sparkless commutation.

Of course, starting can also be accomplished by means of an induction coil system, of the character already illustrated in Figure 3 of the drawings. Such a commutating device may be used simultaneously for positive and negative polarities, which makes possible utilization of a transformer having no neutral, i. e., of a polygonal secondary with a large number of sides.

By varying the angular position of the starting distributor, it is possible to vary the voltage or the intensity of the rectified current, in a manner which will be obvious without further explanation.

The apparatus made according to my invention is capable of operation not only in the air at atmospheric pressure, but also in a gas at a pressure suitably chosen.

While I have disclosed several specific embodiments of my invention, it will be clear that variations of the general arrangement and of the details thereof may be resorted to without departing from the true spirit and scope of the invention.

What I claim is:

1. In combination, in an electrical distribution system, a source of alternating current, a load circuit comprising a grid controlled electronic valve, mechanical commutating means connected in series between said source and said grid controlled electronic valve for supplying unidirectional operating current to said grid controlled electronic valve from said source, and means operative only during commutation of said alternating current by said mechanical commutating means for interrupting said unidirectional current.

2. In combination, in an electrical distribution system, a source of alternating current, a load circuit comprising a grid controlled electronic valve, mechanical commutating means connected in series between said source and said grid controlled electronic valve for supplying unidirectional operating current to said grid controlled electronic valve from said source of alternating current, means for normally biassing the grid of said grid controlled electronic valve to a value enabling current through said electronic valve from said source of alternating current via said mechanical commutating means and means operative only during commutation of said alternating current by said mechanical commutating means for reducing said first mentioned bias of said control grid.

3. In combination, in an electrical distribution system, a source of alternating current, a load circuit comprising an electronic valve having a control electrode, mechanical commutating means connected in series between said source and said electronic valve for supplying unidirectional operating current to said electronic valve from said source, means normally biassing said control electrode to a value adequate to enable current flow through said electronic valve, and means operative only during commutation of said alternating current by said mechanical commutating means for biassing said control electrode to cut-off.

4. In combination, in an electrical distribution system, a source of alternating current, a load device comprising an electronic valve having a control electrode, mechanical commutating means connected in series between said source and said electronic valve for supplying unidirectional operating current to said electronic valve from said source, a condenser connected between said cathode and said control electrode, means normally maintaining a predetermined charge on said condenser for maintaining said control electrode biassed to a value operative to enable passage of said operating current through said electronic valve, and means operative only during commutation of said alternating current by said mechanical commutating means for short-circuiting said condenser.

5. In combination, in an electrical distribution system, a source of alternating current, a load circuit comprising an electronic valve having an anode, a cathode and a control electrode, mechanical commutating means connected in series between said source and said electronic valve for supplying unidirectional operating current for transfer between said anode and said cathode of said electronic valve, a condenser connected between said cathode and said control electrode of said electronic valve, means for normally maintaining a predetermined voltage on said condenser, means for normally applying a predetermined bias to said control electrode, said bias having a magnitude and polarity adapted to enable said transfer of said operating current from said anode to said cathode of said electronic valve, said bias being a function of said voltage on said condenser, a spark gap connected across said condenser, and means operative only during commutation of said alternating current by said mechanical commutating means for breaking down said spark gap and thereby discharging said condenser through said spark gap to vary said bias.

6. A system of current rectification comprising, a plural phase alternating current source, a load device comprising an electronic valve having a control electrode, a rotary commutator for applying unidirectional current to said load device from the phases of said plural phase alternating current source in succession, a synchronous motor energized from said alternating current source for driving said rotary commutator, and means including a rotary circuit maker and breaker driven by said motor for biassing said control electrode to cut-off only during commutation of current by said rotary commutator.

7. In combination, in an electrical distribution system, a source of alternating current, a load circuit comprising a grid controlled electronic oscillator, mechanical commutating means connected in series between said source and said oscillator for supplying unidirectional operating current to said oscillator from said source of alternating current, means for normally biassing said grid of said oscillator to a value enabling generation of oscillation by said oscillator, and means operative only during commutation of said alternating current by said mechanical commutating means for preventing oscillation of said oscillator.

8. In combination, in an electrical distribution system, a source of alternating current, a load circuit comprising an electronic valve having an anode, a cathode and a control electrode, mechanical commutating means connected in series between said source and said electronic valve for supplying unidirectional operating current for transfer between said anode and said cathode of said electronic valve, a condenser connected between said cathode and said control electrode of said electronic valve, a rectifier power supply energized from said source of alternating current for normally maintaining a predetermined unidirectional charge on said condenser and for supplying a predetermined bias to said control electrode, said bias having a magnitude and polarity adapted to enable transfer of said operating current from said anode to said cathode of said electronic valve, and means operating in synchronism with said mechanical commutating means for transiently short-circuiting said condenser during each commutation of said alternating current by said mechanical commutating means to vary said bias to have a magnitude and polarity adapted to prevent transfer of said operating current from said anode to said cathode of said electronic valve.

9. In combination, in an electrical distribution system, a source of alternating current, a load circuit comprising an electronic valve having an anode, a cathode and a control electrode, mechanical commutating means connected in series between said source and said electronic valve for supplying unidirectional operating current for transfer between said anode and said cathode of said electronic valve, a condenser having a pair of terminals, a source of unidirectional biassing potential for said valve, said source of unidirectional biassing potential having a positive terminal and a negative terminal and a further terminal at intermediate potential, means connecting said positive terminal directly to said cathode, means connecting said intermediate terminal to said control electrode, means connecting one terminal of said condenser to said negative terminal of said source of biassing potential, means connecting the remaining terminal of said condenser to said control electrode, and means operative only during commutation of said alternating current by said mechanical commutating means for discharging said condenser to reduce the potential across said condenser substantially to zero during said commutation.

10. In combination, in an electrical distribution system, a source of alternating current, a load circuit comprising an oscillating electronic device having an anode, a cathode and a control electrode, mechanical commutating means connected in series between said source and said oscillating electronic device for deriving unidirectional operating current for said oscillating electronic device from said source, a source of unidirectional bias voltage having a positive terminal, a negative terminal, and a further terminal having a potential intermediate potential of said positive terminal and said negative terminal, means connecting said cathode to said positive terminal, means connecting said control electrode to said further terminal, means connecting a condenser between said intermediate terminal and said negative terminal, a spark gap connected across said condenser, and means operative only during commutation of said alternating current by said mechanical commutating means for breaking down said spark gap and thereby discharging said condenser through said spark gap.

11. In combination in an electrical distribution system, a multiphase source of alternating current, a load circuit comprising an oscillating electronic device having an anode, a cathode and a control electrode, mechanical commutating means connected in series between said multiphase source and said oscillating electronic device for deriving unidirectional operating current for said oscillating electronic device from said multiphase source, a source of unidirectional bias voltage having a positive terminal, a negative terminal, and a further terminal having a potential intermediate the potentials of said positive terminal and said negative terminal, means connecting said cathode to said positive terminal, means connecting said control electrode to said further terminal, means connecting a condenser between said further terminal and said negative terminal, and means operative during each commutation of said alternating current by said commutating means for rapidly discharging said condenser.

PIERRE MARIE GABRIEL TOULON.

References Cited in the file of this patent

UNITED STATES PATENTS

| Number | Name | Date |
|---|---|---|
| 2,103,362 | Hansell | Dec. 28, 1937 |
| 2,188,361 | Koppelmann | Jan. 30, 1940 |
| 2,195,818 | Koppelmann | Apr. 2, 1940 |
| 2,279,729 | Bedford | Apr. 14, 1942 |
| 2,298,130 | Janetschke | Oct. 6, 1942 |
| 2,310,792 | Koppelmann | Feb. 9, 1943 |
| 2,353,427 | Zellweger | July 11, 1944 |
| 2,369,662 | Deloraine et al. | Feb. 20, 1945 |